(12) United States Patent
Abe et al.

(10) Patent No.: US 6,233,653 B1
(45) Date of Patent: May 15, 2001

(54) HIERARCHICAL DATA STORAGE SYSTEM AND DATA CACHING METHOD

(75) Inventors: Tsuyoshi Abe; Yoshihiro Nishida, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/365,711

(22) Filed: Aug. 3, 1999

(30) Foreign Application Priority Data

Feb. 15, 1999 (JP) .................................................. 11-035591

(51) Int. Cl.⁷ ...................................................... G06F 13/14
(52) U.S. Cl. ............................ 711/113; 711/133; 711/159
(58) Field of Search .................................. 711/168, 167, 711/161, 159, 133, 113, 150

(56) References Cited

U.S. PATENT DOCUMENTS 5,485,609 * 1/1996 Vitter et al. ........................... 707/101
5,933,853 * 8/1999 Takagi ................................... 711/159
5,983,318 * 11/1999 Willson et al. ....................... 711/113
6,125,394 * 9/2000 Rabinovich ........................... 709/226
6,128,701 * 10/2000 Malcolm et al. ..................... 711/133

FOREIGN PATENT DOCUMENTS 3-94342    4/1991   (JP) .

* cited by examiner

*Primary Examiner*—David L. Robertson

(57) ABSTRACT

In a hierarchical data storage system that supplies data, on request, from a library apparatus in which the data are stored on removable media and from a high-speed cache device, the requests are analyzed to select the most frequently requested data and predict the system's least busy periods. During each predicted least busy period, data are copied from the library apparatus to the cache device, if necessary, so that all of the selected most-frequently-requested data are stored in the cache device. Data are not transferred from the library apparatus to the cache device at other times, thereby avoiding unnecessary cache replacements and improving the efficiency with which requests can be served.

10 Claims, 5 Drawing Sheets

|  | 1:00 | 2:00 | 3:00 | 4:00 | 5:00 | 6:00 | 7:00 | 8:00 | 9:00 | 10:00 | 11:00 | 12:00 |
|---|---|---|---|---|---|---|---|---|---|---|---|---|
| a.m. | 7 | 3 | 2 | 0 | 0 | 0 | 0 | 1 | 3 | 3 | 4 | 10 |
| p.m | 5 | 3 | 5 | 6 | 8 | 11 | 15 | 19 | 25 | 30 | 28 | 15 |

| n | 0 | 1 | 2 | 3 | 4 | 5 | Xm |
|---|---|---|---|---|---|---|---|
| Rm(n) | 25 | 20 | 30 | 17 | 14 | 22 | |
| W(n) | 1.0 | 0.8 | 0.5 | 0.3 | 0.2 | 0.1 | 66.1 |
| Rm×W | 25.0 | 16.0 | 15.0 | 5.1 | 2.8 | 2.2 | |

FIG.8

|  |  | 1ST DAY | 2ND DAY | 3RD DAY | 4TH DAY | TOTAL REQUESTS |
|---|---|---|---|---|---|---|
| TITLE A |  | 10 | 25 | 10 | 25 | 70 |
| TITLE B |  | 5 | 5 | 15 | 10 | 35 |
| TITLE C |  | 10 | 20 | 5 | 25 | 60 |
| TITLE D |  | 5 | 5 | 15 | 5 | 30 |
| CACHED IN 1ST EMBODIMENT |  | A,C | A,C | B,D | A,C | — |
| REQUEST FREQUENCY $(X_m)$ | TITLE A | 10.0 | 33.0 | 35.0 | 50.5 | — |
|  | TITLE B | 5.0 | 9.0 | 21.5 | 24.5 | — |
|  | TITLE C | 10.0 | 28.0 | 26.0 | 39.0 | — |
|  | TITLE D | 5.0 | 9.0 | 21.5 | 19.5 | — |
| CACHED IN 2ND EMBODIMENT |  | A,C | A,C | A,C | A,C | — |

HIERARCHICAL DATA STORAGE SYSTEM AND DATA CACHING METHOD

BACKGROUND OF THE INVENTION

The present invention relates to a hierarchical data storage system that stores data in a library apparatus, caches part of the stored data in a high-speed cache device, and supplies the stored and cached data on request, more particularly to an improvement in the caching method.

This type of hierarchical data storage system is used by, for example, video-on-demand providers who supply audio and video data to paying customers. The library apparatus is similar to a jukebox, but instead of storing short musical selections, it stores compressed audio and video data on optical discs with capacities ranging, at present, from several hundred megabytes to several gigabytes each. A very large amount of data can thus be stored. To reproduce the stored data, the library apparatus typically has a plurality of optical drives, enabling it to provide output on a plurality of channels simultaneously.

The high-speed cache device, typically a magnetic hard disk drive, improves the performance of the system in several ways. Once audio and video data have been cached in the cache device, they can be supplied to users as soon as requested, without the delay (typically ten seconds or more) occasioned by the physical transport of an optical disc from its storage location to an optical drive in the library apparatus. The number of output channels can also be increased, some channels being served with data from the cache while other channels are served from the library apparatus. Furthermore, the cache device can reproduce a single cached copy of an audio-video program or 'title' on several output channels at once, asynchronously, thereby reducing the need to store multiple copies of popular titles in the library apparatus, and allowing more different titles to be stored.

A conventional method of caching data employs the least-recently-used algorithm. When a request for a particular title is received, the control unit of the system first checks whether the data for the requested title are already cached. If so, the request is served from the cache device. If not, an optical disc storing the requested title is loaded into an available optical drive, and the request is served from the library apparatus. In the latter case, while being supplied to the user, the requested audio and video data are also copied into the cache, so that the next request for the same title can be served from the cache device. If the cache has free space, the data are copied into the free space. If the cache does not have free space, the cached title that has been least recently requested is deleted to make space.

If the library apparatus has multiple drives, two or more titles can be copied from the library apparatus to the cache concurrently. With the conventional caching method, however, there are problems related to the access speed and storage capacity of the cache.

The cache access speed is high, but not unlimited. Because of the limited access speed, when a certain number of titles are being copied from the library apparatus into the cache, the number of output channels that can be served from the cache is reduced by the same number.

The storage capacity of the cache is also limited, in part by cost considerations. Because of the limited cache capacity, with the conventional caching method, titles have to be copied to and deleted from the cache frequently, especially if the requests are varied and the amount of data per title is large and only a few titles can be cached at a time. These conditions are typical of actual video-on-demand systems. If the well-known MPEG-2 video compression method recommended by the Moving Picture Experts Group is used with a compressed data rate of three megabits per second (3 Mbps), for example, then two hours of video, which is a typical length per title, requires 2.7 gigabytes of storage space. High-speed cache facilities that can be provided at a reasonable cost cannot store a large number of titles of this length. As for the variety of requests, some titles are more popular than others, but different users have different preferences, and by no means are all of the requests concentrated on the few most popular titles.

FIG. 1 illustrates a hypothetical case in which the library apparatus has two drives and the cache device (a magnetic disk drive) can store only two titles at once. Initially, titles A and C are cached, title A being the least recently used. When a request for title B is received, title A is deleted from the cache and title B is stored in its place, while being reproduced by the first optical drive in the library apparatus. A short time later, title D is requested, so title D is reproduced by the second optical drive in the library apparatus and copied into the cache, replacing title C. While titles B and D are being copied into the cache, no other titles can be reproduced from the cache because none are stored in the cache.

Shortly after the caching of title D is completed, titles A and C are requested again, so they are recopied into the cache, replacing titles B and D. In this example, the caching of titles B and D has served no useful purpose. Furthermore, if titles A and C had not been deleted to make room in the cache for titles B and D, then the requests for titles A and C could have been served from the cache, leaving the two optical drives free to serve other requests.

As this example illustrates, with the conventional least-frequently-used caching method, when requests for many different titles arrive frequently and many of these titles are not already cached, the cache device is kept busy copying data from the library apparatus, many unnecessary cache replacements are performed, overall efficiency is lowered, the number of output channels that can be supported is reduced, and potential revenue is lost.

SUMMARY OF THE INVENTION

An object of the present invention is to improve the efficiency of operation of a hierarchical data storage system having a library apparatus and a cache device.

The library apparatus has a plurality of removable media, at least one drive for reproducing data from the removable media, and a mechanism for automatically loading the removable media into the drive. The cache device stores and reproduces data copied from the library apparatus, and has a higher data access speed than the drive. The invented method of controlling the library apparatus and cache device comprises the steps of:

receiving requests for data;

operating the library apparatus and cache device so as to reproduce the requested data;

analyzing the requests to select frequently requested data and predict least busy periods; and copying the selected data from the library apparatus to the cache device during the predicted least busy periods.

The invention also provides a hierarchical data storage system having a computing device that carries out these steps.

BRIEF DESCRIPTION OF THE DRAWINGS

In the attached drawings:

FIG. 8 illustrates the operation of two embodiments of the invention.

DETAILED DESCRIPTION OF THE INVENTION

Figure 2:
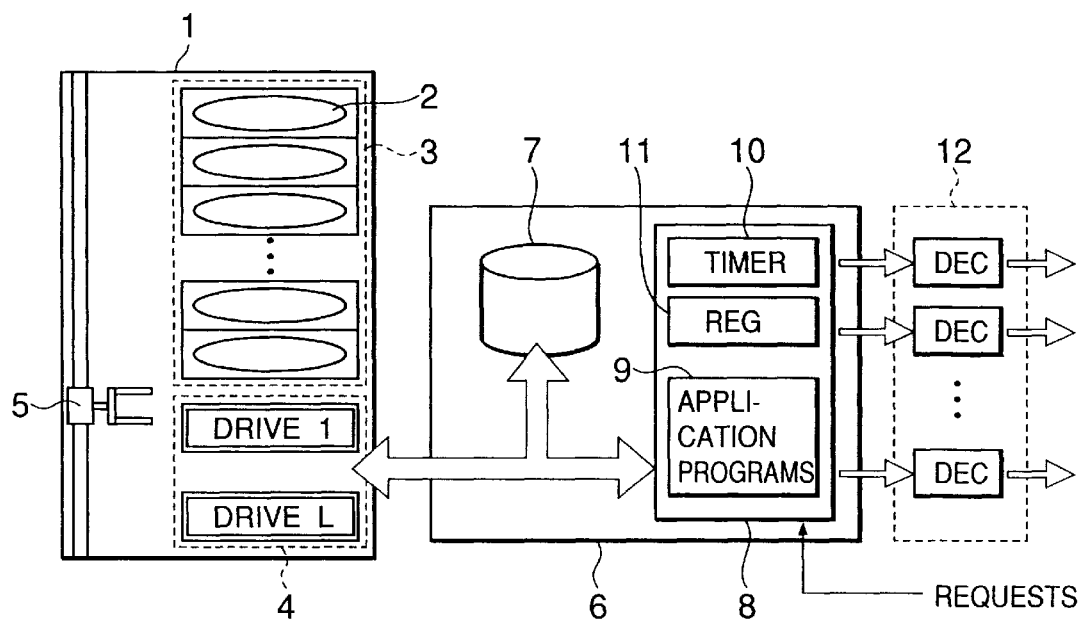
FIG. 2 is a block diagram of a hierarchical storage apparatus illustrating the present invention.

The two embodiments of the invention will be described with reference to the attached drawings. Both embodiments relate to the hierarchical data storage system shown in FIG. 2.

This system comprises a library apparatus 1 storing a plurality of optical discs 2 on shelves 3. The library apparatus 1 has a plurality of optical drives 4, numbered from one to L in the drawing, for reproducing the data stored on the optical discs 2. L may be any integer greater than one. The optical discs 2 are transported between the shelves 3 and optical drives 4 by a mechanical hand 5.

The library apparatus 1 is controlled by a control unit 6 comprising a magnetic disk drive 7 and a computing device 8. The computing device 8 comprises, for example, a memory storing application programs 9, a timer 10, and a microprocessor (not visible). A register 11 for storing a request count is provided in the microprocessor or memory. The computing device 8 executes the application programs 9, which read compressed audio and video data from the optical drive 4 and magnetic disk drive 7, and supply the data to a plurality of video decoders (DEC) 12. The video decoders 12 decode the compressed data to obtain analog video signals, which are supplied to users in response to requests. Each video decoder 12 corresponds to one output channel of the system.

The magnetic disk drive 7 is used as a cache device for the library apparatus 1. The access speed of the magnetic disk drive 7 is, for example, some ten times faster than the speed of the optical drives 4. The storage capacity of the magnetic disk drive 7 is large, but is limited because the magnetic disks in the magnetic disk drive 7 are not replaceable. The storage capacity of the library apparatus 1 is much larger, because of the high data recording density of the optical discs 2, and because a large number of optical discs 2 can be stored on the shelves 3 for selective loading into the optical drives 4.

The data stored in the library apparatus 1 are audio and video data identified by titles. One of the application programs 9 executed by the computing device 8 receives requests for these titles, and determines whether the corresponding data are cached in the magnetic disk drive 7. If so, this application program transfers the requested data from the magnetic disk drive 7 to one of the video decoders 12. If not, this application program controls the mechanical hand 5 in the library apparatus 1 so as to load an optical disc 2 on which the requested title is stored into an available optical drive 4, and transfers the data reproduced by the optical drive 4 from the library apparatus 1 to the video decoder 12, but does not copy the requested data to the magnetic disk drive 7.

Each time a request for any title is received, this application program also increments the request count in the register 11, and updates a request history table (shown later) listing request counts for each title.

The request history table and a request count time series (shown later) are stored in the memory of the computing device 8. Alternatively, they may be stored in the magnetic disk drive 7. Other information stored in the control unit 6 includes a table of contents listing the storage location and length of each title.

The timer 10 generates interrupt signals at regular intervals. The following description will assume one timer interrupt per hour. These timer interrupts start another application program that analyzes the requests to predict the least busy times of the system.

Figure 3:
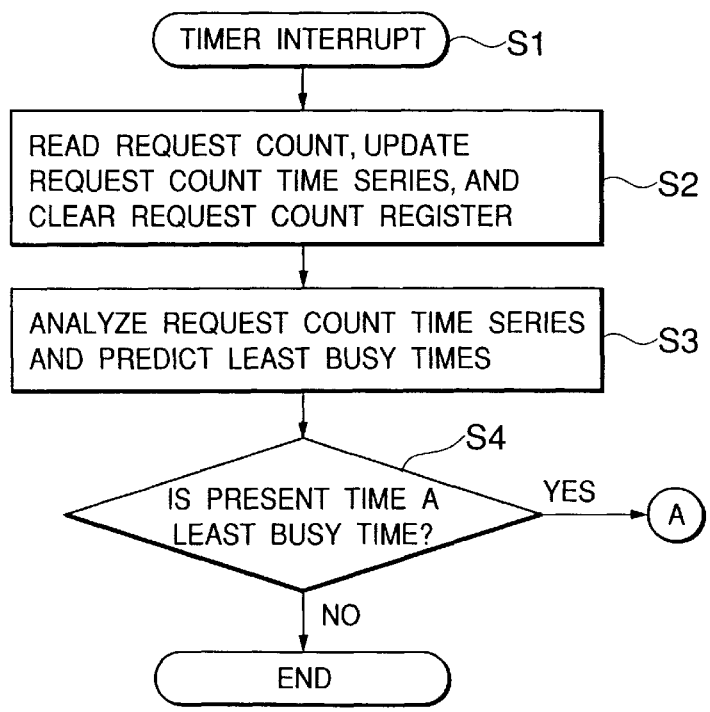
FIG. 3 is a flowchart illustrating the operation of an application program in the system in FIG. 2.

FIG. 3 illustrates the operation of this application program. When a timer interrupt occurs (step S1), the program reads the register 11 to determine the total number of requests that have occurred during the past hour, updates the request count time series, which gives hourly request totals, then clears the request count in the register 11 to zero (step S2) in preparation for counting requests during the next hour. Next, by analyzing the request count time series, the application program predicts the least busy times (step S3), these being the times during which fewest requests are expected. The program also compares the present time with the predicted least busy times (step S4). If the present time is not among the predicted least busy times, the program ends without taking further action. If the present time is one of the predicted least busy times, however, the program starts a further application program for cache replacement.

Figures 4, 5:
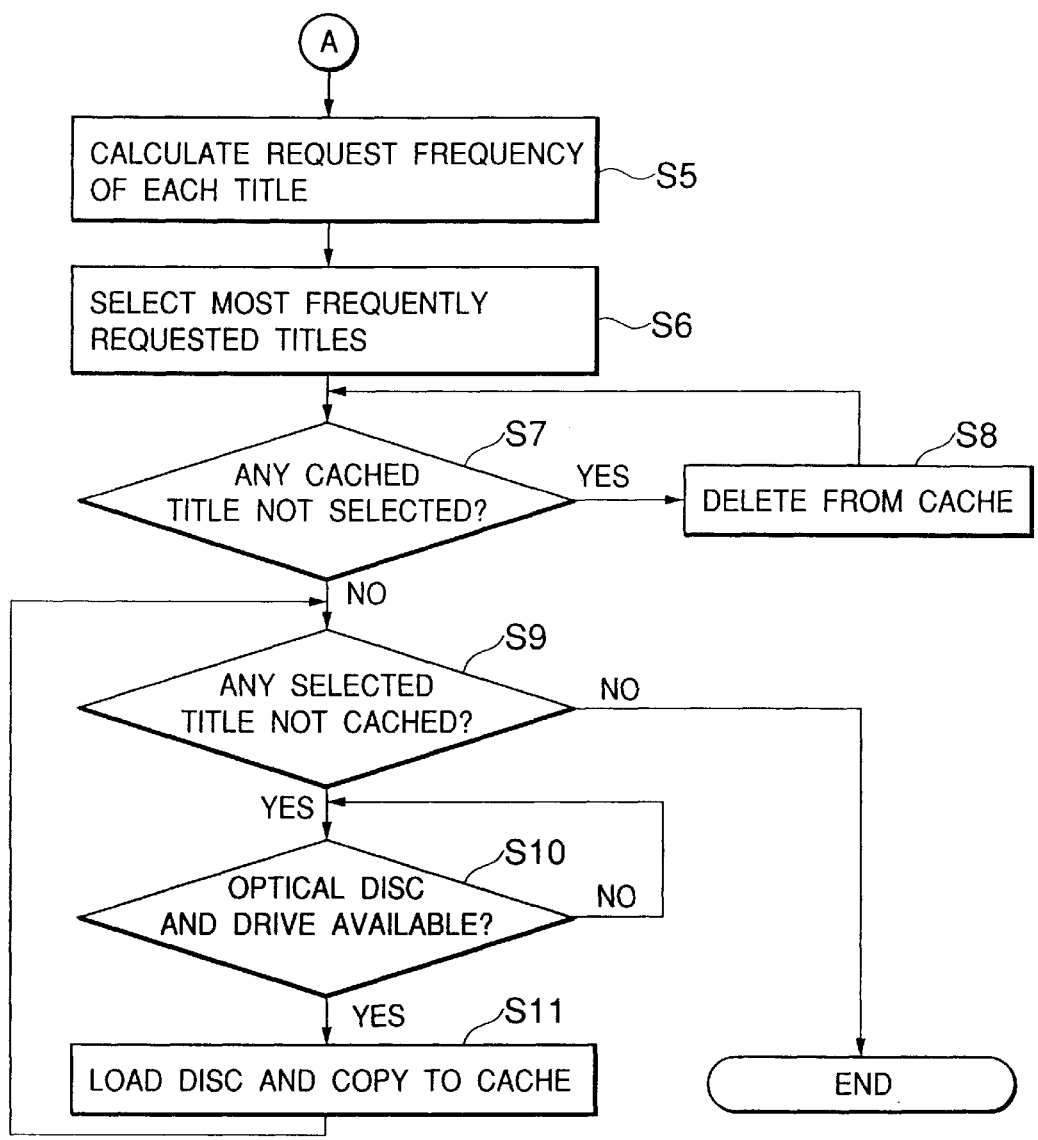
FIG. 4 is a flowchart illustrating the operation of another application program in the system in FIG. 2.
FIG. 5 shows an example of a request count time series.

Referring to FIG. 4, the cache replacement application program analyzes the request history table and calculates a request frequency for each title (step S5). For example, the program calculates the total number of times each title has been requested during the past twenty-four hours. Next, the program sorts the titles in order of their request frequencies, and selects a certain number of most frequently requested titles (step S6). For example, the program selects titles one by one from the top of the sorted list until the total data size of the requested titles exceeds the storage capacity of the magnetic disk drive 7, then discards the last selected title, so that the selected titles represent the maximum number of most frequently requested titles that can be cached in the magnetic disk drive 7.

Next, the program inspects the current contents of the magnetic disk drive 7 (step S7), as listed in the abovementioned table of contents, to determine whether any cached title is missing from the titles selected in step S6. If so, this title is deleted from the magnetic disk drive 7 (step S8) Steps S7 and S8 are repeated until the magnetic disk drive 7 stores only titles that were selected in step S6.

The list of titles selected in step S6 is now examined to see if any of the selected titles are not stored in the magnetic disk drive 7 (step S9). If there is such a non-cached selected title, the program determines whether an optical disc 2 on which this title is stored and an optical drive 4 on which the optical disc 2 can be played are currently available for use in the library apparatus 1 (step S10). If not, the program waits for an optical disc 2 and optical drive 4 to become available. The program then commands the mechanical hand 5 to load the optical disc 2 into the available optical drive 4, and controls the optical drive 4 and magnetic disk drive 7 so as to copy the data of the selected title from the optical disc 2 into the magnetic disk drive 7 (step S1). Steps S9, S10, and S11 are repeated until all of the titles selected in step S6 are stored in the magnetic disk drive 7, at which point the program ends.

The operation of the first embodiment will now be described with reference to the request count time series shown in FIG. 5. The illustrated time series indicates the hourly request totals for the past day ending at, for example, midnight. During this past day, there was a four hour period beginning at 4:00 a.m. in which no requests were received. This period is selected as the least busy period. At 4:00 a.m. in the morning of the next day, the application program illustrated in FIG. 4 begins replacing the contents of the magnetic disk drive 7 by deleting and copying titles as necessary. This cache replacement operation continues until the magnetic disk drive 7 stores the titles that were most frequently requested during, for example, the most recent twenty-four-hour period, ending at 4:00 a.m. If there are a plurality of titles to be copied and a plurality of optical drives 4 are available for use in the library apparatus 1, two or more titles can be copied concurrently. The number of titles that can be copied at once is limited only by the number of available optical drives 4 and the access speed of the magnetic disk drive 7.

The amount of time required for the cache replacement operation depends on the number of titles that have to be replaced and the number that can be copied concurrently, but for typical conditions, the caching operation will be completed during the predicted least busy period from 4:00 a.m. to 8:00 a.m. Normally, few if any requests are received during this period, so the cache replacement operation does not interfere with service to users. When the cache replacement operation ends, all of the access capability or bandwidth of the magnetic disk drive 7 is available for serving new requests, until the next cache replacement operation begins at, probably, about 4:00 a.m. the next morning.

The first embodiment depends on having the least busy periods occur at predictable times, but in real situations, this is usually the case.

By scheduling the caching operation for the least busy periods, the first embodiment enables better service to be provided during other, more busy periods.

Figure 1:
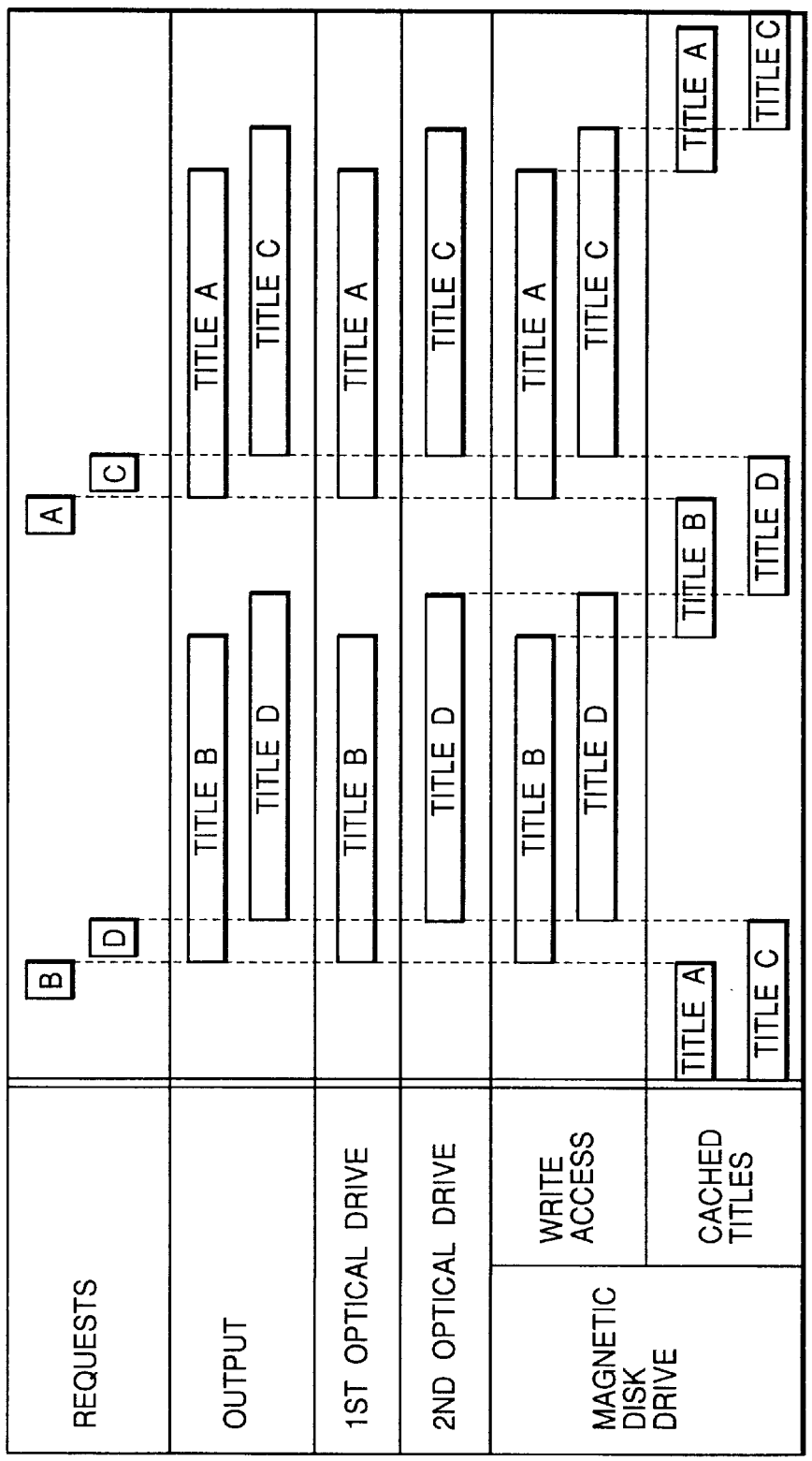
FIG. 1 shows an example of inefficient cache replacement.

By concentrating the caching operation into a single period each day, the first embodiment avoids the repeated copying and deleting of the same title that was illustrated in FIG. 1, thereby improving the operational efficiency of the system.

As a result, better service can be provided to more users. In a commercial video-on-demand system, revenues can be increased.

Next, a second embodiment will be described. The second embodiment is identical to the first embodiment, except for the way in which request frequencies are calculated.

Figures 6, 7:
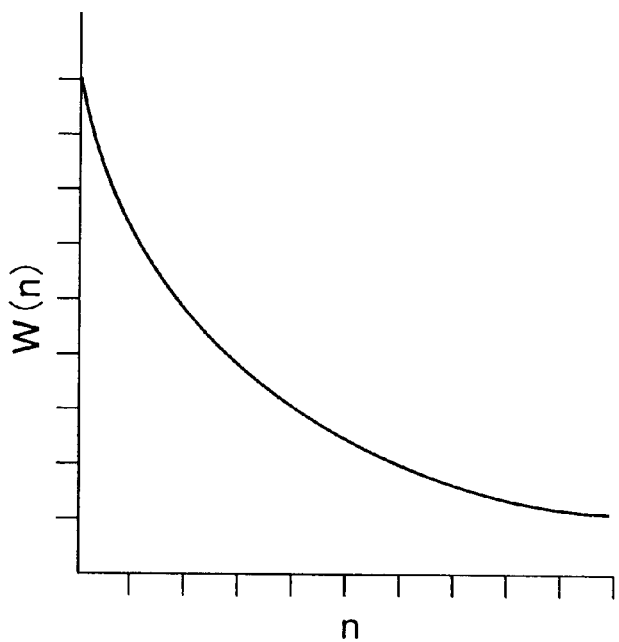
FIG. 6 is a graph illustrating weighting coefficients.
FIG. 7 illustrates a request frequency calculation.

In the second embodiment, the request frequency of a particular title is calculated as a weighted sum of its daily request totals over a certain preceding number of days. The weighting coefficients decrease with increasing distance from the present, as illustrated in FIG. 6, for example. The horizontal axis in FIG. 6 indicates time measured backward in days (n) from the present. The vertical axis indicates the value of the corresponding weighting coefficients $W(n)$ in arbitrary units.

FIG. 7 shows an example of the calculation of the request frequency of the m-th title. $Rm(n)$ is the total number of requests for this title during the n-th day in the past. For example, $Rm(0)$ is the number of requests received during the current calendar day. These values $Rm(n)$ are multiplied by the corresponding weighting coefficients $W(n)$, and the resulting products ($Rm \times W$) are added up to obtain a request frequency $Xm$. The mathematical formula for this calculation is:

$$Xm = Rm(0) \cdot W(0) + Rm(1) + \ldots + Rm(n) \cdot W(n)$$

FIG. 8 illustrates the request history table and frequency calculations for the first four days of operation of a hypothetical system storing four titles A, B, C, D, using the weighting coefficients shown in FIG. 7. The request history table stores a daily request total for each title. For example, during the first day of operation, titles A and C were requested ten times each, and titles B and D five times each. Titles A and C are also requested more often than titles B and D on the second day, but this situation is reversed on the third day.

The magnetic disk drive 7 is assumed to have a storage capacity adequate for two titles. In the first embodiment, in which the caching selection was made on the basis of the previous day's request totals, titles A and C are cached after the first and second days, but titles B and D are cached after third day. The large number of requests for titles B and D on the third day turns out to have been an isolated occurrence, however, as requests for titles A and C predominate again on the fourth day.

During the fourth day, if none of the requests occur in the predicted least busy period during the early hours of the morning, when titles B and D are being copied into the cache, the first embodiment serves the fifteen requests for titles B and D from the magnetic disk drive 7, while the fifty requests for titles A and C are served from the library apparatus 1. The first embodiment provides better service than the conventional apparatus that keeps the magnetic disk drive 7 busy performing cache replacement operations throughout the day, repeatedly deleting titles shortly after they have been cached. It is clear, however, that still better service could have been provided by leaving titles A and C in the cache on the fourth day, instead of replacing them with titles B and D.

In the second embodiment, at the end of the third day, the weighting formula shown above gives higher request frequencies for titles A and C than for titles B and D, even through titles B and D were requested more often on the third day, because the preceding two days are also included in the calculation. Accordingly, titles A and C are left in the cache, and the fifty requests for these titles that are received on the fourth day are served from the magnetic disk drive 7. Even requests arriving during the predicted least busy period on this day can be served from the magnetic disk drive 7, because no cache replacement operations are performed.

By employing weighting coefficients of the type shown in FIGS. 6 and 7, the second embodiment is able to adjust to changing request trends without being unduly affected by random fluctuations in the request counts. Unnecessary or undesirable cache replacements are thereby avoided, further increasing the operational efficiency of the system.

The second embodiment is not limited to decreasing weighting coefficients as shown in FIGS. 6 and 7, however. For example, if different request patterns occur on weekdays and weekends, the weighting coefficients can be adjusted to take this into account.

The invention is not limited to the use of a magnetic hard disk drive as the caching device. For example, semiconductor memory can be employed instead.

The library apparatus 1 can employ any type of drives, and any media capable of being loaded into the drives automatically. Optical media and drives complying with any of the various compact disc (CD) and digital video disc (DVD) specifications can be used, for example, or magneto-optical (MO) discs and drives may be used.

The data may be stored in the above-mentioned MPEG-2 compressed format, or in any other convenient format, and any type of decoder can be employed.

The data stored in the library apparatus 1 are not limited to audio and video data.

Those skilled in the art will recognize that further variations are possible within the scope claimed below.

What is claimed is:

1. A hierarchical data storage system, comprising:
    a library apparatus having a plurality of removable media storing data, at least one drive for reproducing the data, and a mechanism for automatically loading the removable media into the drive;
    a cache device storing data copied from the library apparatus and reproducing the stored data, the cache device having a higher data access speed than said drive; and
    a computing device receiving requests for said data, controlling said library apparatus and said cache device, thereby causing the requested data to be reproduced, analyzing said requests, thereby selecting data that are requested most frequently and predicting least busy periods, and copying the selected data from said library apparatus to said cache device during the predicted least busy periods.

2. The hierarchical data storage system of claim 1, wherein said computing device selects said data that are requested most frequently by calculating weighted sums of numbers of requests received in past periods of time, using different weighting coefficients for different past periods of time.

3. The hierarchical data storage system of claim 2, wherein said weighting coefficients decrease with increasing distance from a present time.

4. The hierarchical data storage system of claim 1, wherein the data stored in said library apparatus include audio and video data.

5. The hierarchical data storage system of claim 1, wherein the data stored in said library apparatus and said cache device are reproduced simultaneously in response to different requests.

6. A method of controlling a library apparatus having a plurality of removable media storing data, at least one drive for reproducing the data, and a mechanism for automatically loading the removable media into the drive, and a cache device having a higher data access speed than said drive, storing and reproducing data copied from the library apparatus, comprising the steps of:
    receiving requests for said data;
    operating said library apparatus and said cache device, thereby causing the requested data to be reproduced;
    analyzing said requests, thereby selecting data that are requested most frequently and predicting least busy periods; and
    copying the selected data from said library apparatus to said cache device during the predicted least busy periods.

7. The method of claim 6, wherein said step of analyzing said requests comprises the further step of calculating weighted sums of numbers of requests received in past periods of time to select the data that are requested most frequently, using different weighting coefficients for different past periods of time.

8. The method of claim 7, wherein said weighting coefficients decrease with increasing distance from a present time.

9. The method of claim 6, wherein the data stored in said library apparatus include audio and video data.

10. The method of claim 6, wherein said step of operating includes the further step of reproducing the data stored in said library apparatus and said cache device simultaneously in response to different requests.

* * * * *